Oct. 28, 1969    R. A. HANMER    3,474,565
AUTOMOTIVE VEHICLE
Filed Nov. 2, 1966

3,474,565
AUTOMOTIVE VEHICLE
Richard Alan Hanmer, San Anselmo, Calif., assignor to The Lazy Eight (∞) Inc., Cambridge, Mass., a corporation of Massachusetts
Filed Nov. 2, 1966, Ser. No. 591,607
Int. Cl. A63h 11/00
U.S. Cl. 46—206                                    5 Claims

ABSTRACT OF THE DISCLOSURE

A toy vehicle is provided which will turn continuously along a curved path without external influence. A motor driven front wheel is spaced laterally of the vehicle centroid in the direction opposite to the direction of turn and rigidly positioned straight ahead. A rear wheel is rigidly positioned to steer the vehicle in the direction of turn. Another wheel or support member is employed to give stability and the vehicle is constructed to load the rear wheel more heavily than any other wheel or support member.

---

Figure 1:
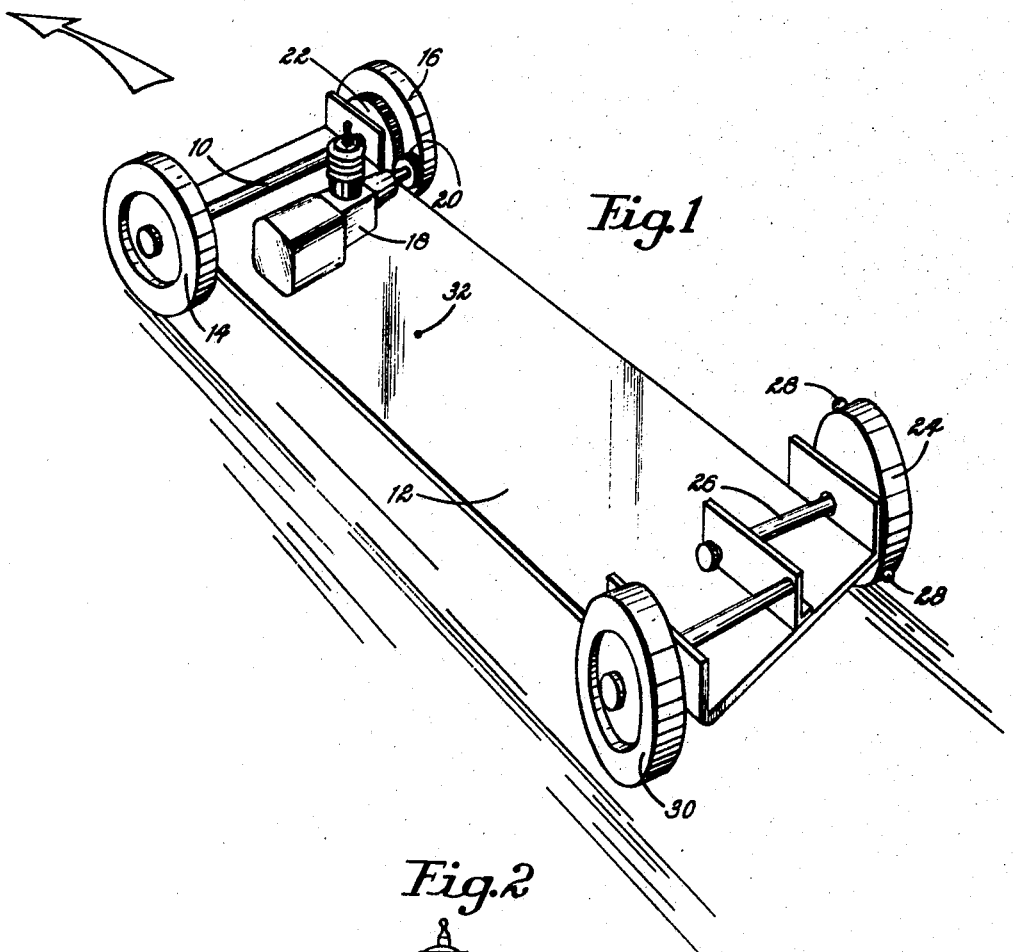

This invention relates to driverless automotive vehicles (e.g. toy racing cars).

Toy cars have previously been designed to travel in a curved path by the application of external restraint, as in the form of a curved track or some other device external to the car for controlling its steering, such as a tether or leash.

Objects of the present invention are to provide a car that will travel with stability at high speed along a curved path, without external guidance or control; to realistically simulate, in a toy car, the travel of a racing car around a curved track; and to provide means for limiting the radius of travel of the vehicle at high speeds.

In general the invention features a vehicle designed to travel while turning continuously either left or right. The desired result is accomplished providing an unsprung car, and by driving it through a front wheeel which is spaced laterally from the vehicle centroid in the direction opposite the direction of turning, and is rigidly aimed straight ahead; and by providing a rear wheel which is rigidly aimed to steer the vehicle in the direction of turn and which is more heavily loaded when operating at full speed than any other individual wheel, together with at least one other supporting element contacting the travel surface, preferably in the form of an idler wheel, for maintaining the car in upright position. The additional supporting element may take the form of a second front wheel, or a second rear wheel, or both. In a preferred embodiment there is a single driven front wheeel at the outside of the curved path, a free rotating (idler) front wheel, and a single rear wheel; for the sake of appearance, an imitation second rear wheel is so mounted that it does not contact the ground and does not provide any support.

In order to limit the radius of travel, means is provided to break away the rear end of the car to an extent proportional to the speed of travel. In a preferred embodiment, this is provided in the form of means for causing the rear wheel or wheels to bounce off the travel surface, permitting the rear end to move laterally outwardly of the travel path by inertia while the rear wheels are off the ground, the extent of bouncing (hence the extent of rear-end lateral movement permitted) being increased as the speed of travel increases. A simple and effective means for causing bouncing is the provision of one or more circumferentially spaced fixed projections or bumps on the surface of the rear wheel or wheels which contacts the travel surface.

The device of the present invention, by providing that the front end breaks away from the road surface before the rear end greatly reduces the possibility that the car will spin out, and by providing for controlled breaking away of the rear end, proportional to speed, limits the diameter of the travel path.

Figure 2:
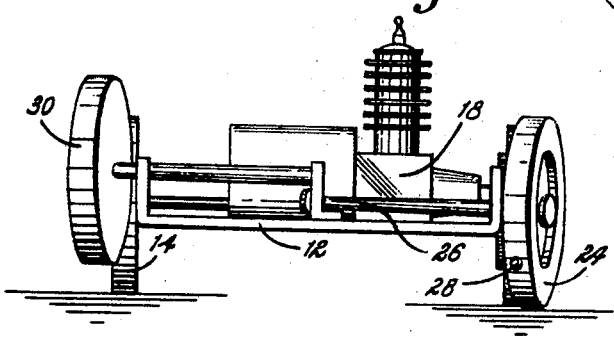

Other objects, features and advantages will become apparent from the following description of a preferred embodiment of the invention, taken together with the attached drawings thereof, in which:

FIG. 1 is a perspective view of the chassis of the vehicle of the invention; and FIG. 2 is a rear view.

Fixed front axle 10 is mounted on frame 12 and carries freely rotatable left wheel 14 and driven right wheel 16, both aimed rigidly straight ahead. Gasoline motor 18 drives wheel 16 through gears 20 and 22.

The rear wheel unit in this embodiment includes freely rotatable (idler) rear wheel 24 mounted on axle 26 and aimed rigidly to the right (e.g. at 14°, depending on the desired drive circle radius). The mass distribution in this embodiment is such that the centroid of the car is located approximately at point 32; consequently, wheel 24 bears substantially more than one-third of the total load, and more than either of wheels 14 and 16, under dynamic conditions, i.e., when the car is operating at full speed. Both wheels 16 and 24 are spaced laterally of the vehicle centroid in the direction opposite to the direction of turning. Rear wheel 30 is an imitation, does not contact the travel surface either when the car is at rest or when it is travelling, and is present only for appearance. Two projections or protuberances 28, 28 are located diametrically opposite each other on the surface of wheel 24 which comes into contact with the travel surface.

Used as a toy, the vehicle may be about a foot long and built to the scale of a racing car, a body of any desired design and configuration (not shown) being mounted on the chassis.

In operation the vehicle will turn constantly to the left (as indicated by the arrow, FIG. 1), the initial diameter of the travel path, when the car is running or accelerating at low speed up to about 5 m.p.h., being approximately five feet in the case of the embodiment described above. At such speeds, the bounce of wheel 24 produced by projections 28, 28 has little effect on the travel path, the car following substantially the same path as it would follow if the projections were omitted. No appreciable lateral sliding of the wheels over the travel surface occurs at such speeds, the car simply following the curve determined by the spacing between front and rear wheels and the angular mounting of the rear wheels. Under these conditions the weight distribution between the three load-bearing wheels is approximately the same as the distribution under static conditions; the rear wheel 24 and idle front wheel 14 support approximately equal loads, while the load on drive wheel 16 is approximately one-third to one-half the load on each of the other two wheels. As the car accelerates, the load on idle front wheel 14 decreases and the load on driven front wheel 16 increases while that on rear wheel 24 remains aproximately constant, and greater than the load on either front wheel under these dynamic conditions. Because of this distribution of load, the front end of the car breaks loose from the travel surface before the rear end, so that the diameter of the travel path increases as the speed increases. The precise diameter of the travel path at any given speed will, of course, depend upon several variable factors such as the nature of the wheel surface (frequently solid rubber or synthetic plastic tires for toy cars), the nature, particularly the smoothness, of the travel surface, etc. Maximum speed may be of the order of 40 m.p.h. or more.

However, in order that toy cars may be used in a race, with each other, it is important that all cars have a travel path of approximately the same diameter regardless of speed. An upper limit is placed on the diameter of the travel path by the projections 28, 28 which cause rear wheel 24 to bounce off, i.e. break loose from, the travel surface. Because the proportion of time the wheel 24 is in frictional engagement with the travel surface decreases as the speed increases, the extent of slide (in a direction outwardly of the travel path) of the rear end increases with increasing speed, causing the attitude of the car to change. The angle between the car and the tangent to the travel path is thus increased, i.e. the car heads more nearly toward the center of the path, so that the diameter tends to be decreased by the action of driven wheel 16 urging the car toward the center of the travel path.

Depending upon the nature of the wheel surface and travel surface, it may be desirable to have a greater or lesser number of projections on the surface of wheel 24. It is also possible to provide for bouncing the rear wheel off the travel surface by using an eccentric wheel or by mounting the wheel on an eccentric bearing.

It will be appreciated that it is also possible to have the second rear wheel 30 mounted as an idler to support a minor part of the load of the car, in which case it is also possible to eliminate the idler front wheel 14 if desired, or to raise it out of contact with the travel surface and make it an imitation wheel. The vehicle may be constructed to turn continuously to the right instead of to the left, if desired.

I claim:

1. A toy vehicle constructed to turn continuously along a curved path, comprising a driven front wheel spaced laterally of the vehicle centroid in the direction opposite to the direction of said turning and rigidly aimed straight ahead, a motor arranged to drive said wheel, at least one rear wheel rigidly positioned to steer the vehicle in the direction of said turn, and a support member contacting the travel surface for maintaining said vehicle in an upright position, the weight distribution of said vehicle being arranged to load said rear wheel more heavily than any other wheel or said support member under dynamic conditions when said rear wheel is in contact with the travel surface.

2. The vehicle of claim 1 where there is a non-driven front wheel in addition to said driven front wheel.

3. The vehicle of claim 1 wherein there is a single load supporting rear wheel, spaced laterally of the vehicle centroid in the direction opposite to the direction of turn.

4. The vehicle of claim 3 wherein said rear wheel has at least one projection on its travel surface contacting portion.

5. The vehicle of claim 4 further including a non-driven front wheel and a second rear wheel raised permanently out of contact with the travel surface.

References Cited

UNITED STATES PATENTS

| | | | |
|---|---|---|---|
| 2,091,872 | 8/1937 | Muller | 46—211 |
| 2,885,823 | 5/1959 | Smith | 46—213 |

LOUIS G. MANCENE, Primary Examiner

C. R. WENTZEL, Assistant Examiner

U.S. Cl. X.R.

46—213